United States Patent
Exner et al.

[11] Patent Number: 5,749,598
[45] Date of Patent: May 12, 1998

[54] STEERING WHEEL ASSEMBLY

[75] Inventors: Gregory F. Exner, Woodhaven; John Curtis Hofer, Troy; Sheryar Durrani, Canton; Richard L. Matsu, Plymouth, all of Mich.

[73] Assignee: Breed Automotive Technology, Inc., Lakeland, Fla.

[21] Appl. No.: 821,616

[22] Filed: Mar. 20, 1997

[51] Int. Cl.⁶ ............................................ B60R 21/16
[52] U.S. Cl. ................... 280/728.2; 280/731; 280/779; 74/552
[58] Field of Search ................ 280/728.2, 731, 280/779; 74/552, 553

[56] References Cited

U.S. PATENT DOCUMENTS

| | | | |
|---|---|---|---|
| 3,264,019 | 8/1966 | Houvener et al. | 403/8 |
| 3,984,126 | 10/1976 | Goetz et al. | 280/740 |
| 4,721,008 | 1/1988 | Stoops et al. | 74/552 |
| 5,615,910 | 4/1997 | Margetak et al. | 280/731 |
| 5,676,396 | 10/1997 | Föhl | 280/731 |
| 5,692,769 | 12/1997 | Scharboneau et al. | 280/728.2 |

*Primary Examiner*—Christopher P. Ellis
*Attorney, Agent, or Firm*—Howard & Howard

[57] ABSTRACT

A steering wheel assembly generally comprises a hub having a bore for receiving an outer end of a steering column shaft. A gear having circumferentially spaced teeth is disposed within an upper end of the bore. The gear includes threads complementary to threads on an outer end of the steering column shaft. A hub cap is threadably secured over an outer end of the bore in the hub, thereby retaining the gear within the hub. A hub plate is secured to the hub and provides structure to which an airbag inflator is secured above the hub and hub cap. During removal of the steering wheel assembly from the steering column shaft, the gear impinges upon the hub cap and directly transmits force to the hub to separate the hub from the steering column shaft.

15 Claims, 4 Drawing Sheets

STEERING WHEEL ASSEMBLY

BACKGROUND OF THE INVENTION

The present relates to a vehicle steering assembly with an improved structure for removing a steering wheel and airbag assembly from a steering column shaft.

Before the introduction of airbags, steering wheel assemblies could be easily attached to a steering column shaft. Access to the column shaft through a steering wheel assembly was made through the hub of the steering wheel assembly from the front face of the steering wheel assembly.

Airbag assemblies for a driver of a vehicle are typically located on the hub of a steering wheel assembly. Thus, access to a steering column shaft through the hub of a steering wheel assembly has become more difficult. Some methods of attaching a steering wheel and airbag assembly to a steering column shaft require a two step process. A steering wheel assembly is initially attached to a steering column shaft. An airbag assembly is then attached to the steering wheel assembly.

In order to reduce assembly time and labor costs, a modular steering wheel and airbag combination has been developed. The modular steering wheel and airbag combination comprises a steering wheel armature and a separate hub plate. An airbag assembly is attached to the hub plate to form a hub plate subassembly. The hub plate subassembly is then attached to a steering wheel assembly including the steering wheel armature.

A structure for securing the steering wheel and airbag combination is accessible from the rear face of the combination. The hub plate is welded or integral with a hub having a bore into which the steering wheel shaft is inserted. A gear, preferably a helical gear having angled teeth, is disposed within the bore of the hub. The gear also includes threads complementary to threads on an outer end of the steering column shaft. A worm is adapted to drive the helical gear to secure the helical gear to the steering column shaft, thereby retaining the hub to the outer end of the steering column shaft. This structure is described in further detail in copending U.S. application Ser. No. 08/522,627, filed Sep. 1, 1995, the Assignee of which is the Assignee of the present invention.

To remove the steering wheel assembly, the worm drives the helical gear in an opposite direction, drawing the gear axially away from the steering column shaft. The helical gear assists in forcing the hub plate away from the steering column shaft by impinging on the back of the airbag inflator. However, the force exerted against the airbag inflator may damage the airbag inflator or the fasteners between the airbag inflator and the hub plate or the weld between the hub plate and hub. The force is particularly great if the steering wheel assembly includes a "wedge lock" between the hub plate and steering column shaft or if the steering wheel assembly has been assembled on the steering column shaft for many years.

SUMMARY OF THE INVENTION

The present invention provides a vehicle steering assembly which includes an improved structure for preventing damage while removing the steering wheel assembly from a steering column shaft.

The steering wheel assembly generally comprises a hub having a bore through which a steering column shaft is inserted. A pair of worm bores extend laterally into the hub on either side of the bore. A gear having circumferentially spaced teeth is disposed within the bore and includes threads complementary to threads on an outer end of the steering column shaft. A hub cap is removably secured on an outer end of the bore and the hub, thereby retaining the gear within the bore. A hub plate is formed integrally with or secured to the hub. The hub plate is generally concave and provides a structure for mounting an airbag inflator. An airbag inflator is mounted to the hub plate above the bore and hub cap of the hub.

During assembly, the hub plate is secured to the hub and the gear is inserted into the upper end of the bore. The hub cap is then threaded into the outer end of the bore, thereby retaining the gear within the bore. The airbag inflator is then secured to the hub plate above the hub cap and hub.

This steering wheel and airbag assembly is then mounted to the steering column shaft. First, the outer threaded end of the steering column shaft is inserted into the bore of the hub until the outer end of the steering column shaft contacts the gear. A tool having a worm is then inserted through one of the worm bores laterally into the hub. The worm engages the circumferentially spaced teeth of the gear. Rotation of the tool causes rotation of the gear about the axis of the steering column shaft, thereby threadably securing the gear to the outer end of the steering column shaft and retaining the hub on the steering column shaft.

In order to remove the steering wheel assembly from the steering column shaft, the worm tool is again inserted into one of the worm bores such that the worm engages the teeth of the gear. The tool is then rotated in a reverse direction to threadably disengage the gear from the outer end of the steering column shaft. During removal, the gear will impinge upon the hub cap, which directly transmits force to the hub to force the hub away from the steering column shaft. Therefore, there are no forces exerted against the airbag inflator, and no stress is placed upon the points of attachment between the airbag inflator and the hub plate or the hub plate and the hub.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF PREFERRED EMBODIMENT

Figure 1:
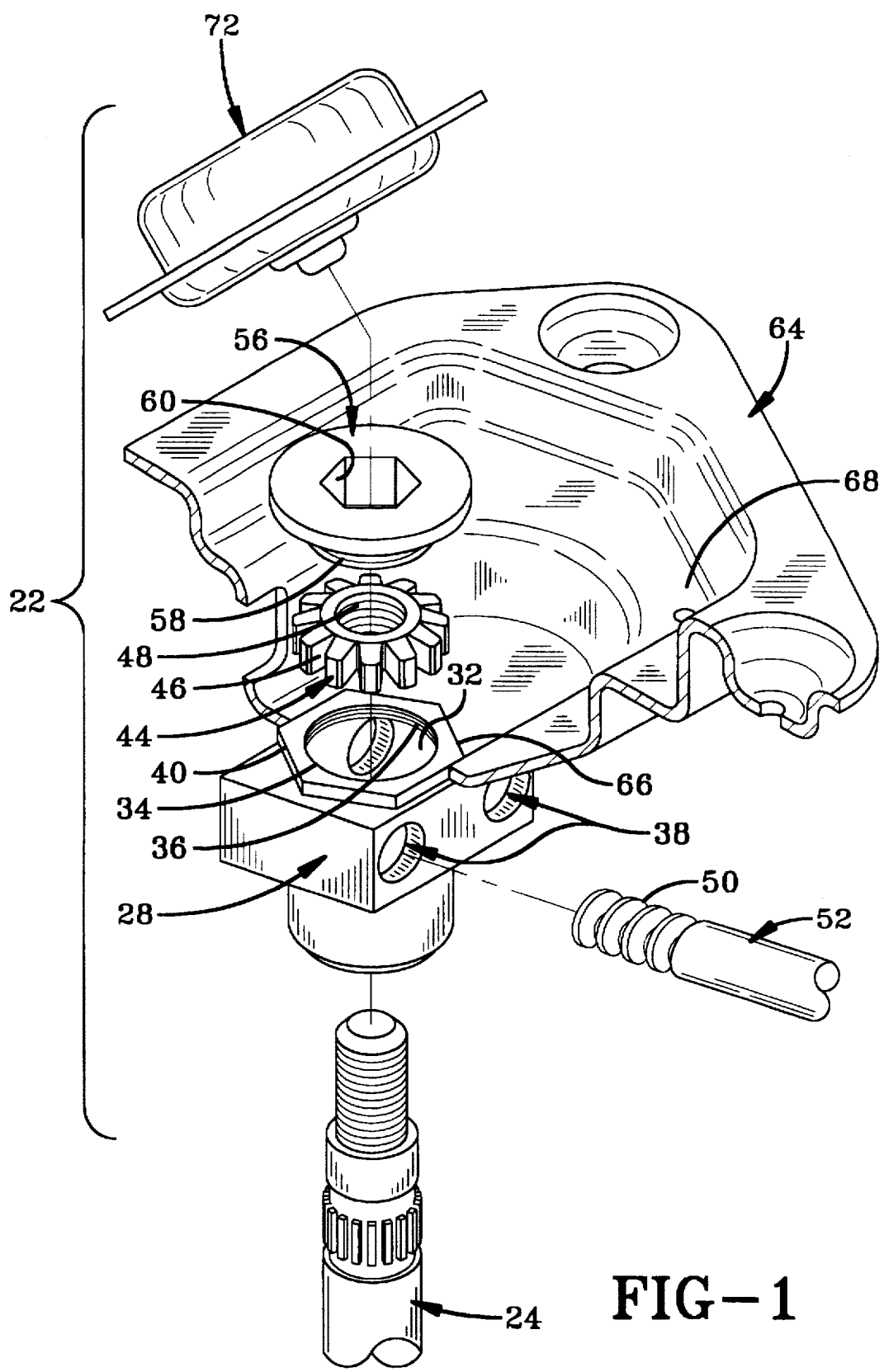
FIG. 1 is a perspective exploded view, partially broken away of the steering wheel assembly of the present invention.

A vehicle steering assembly 20 according to the present invention is shown in FIG. 1. The vehicle steering assembly 20 generally comprises a steering wheel assembly 22 which is secured to a steering column shaft 24 in a manner according to the present invention.

The steering wheel assembly 22 includes a hub 28 having an axial bore 32 for receiving the steering column shaft 24. An axially outer end 34 of the bore 32 includes a set of internal threads 36. The hub 28 further includes a pair of worm bores 38 extending laterally into the hub 28 on either side of the bore 32 and in communication with the bore 32. A hex head 40 is preferably formed at the outer end 34 of the hub 28.

The steering wheel assembly 22 further comprises a gear 44, preferably a gear nut 44 having circumferentially spaced teeth 46 and a threaded axial bore 48. The teeth 46 on the gear nut 44 are complementary to a worm 50 formed on the axial outer end of a worm tool 52. The gear nut 44 may include a web-flange (not shown) at its lower end as described in copending U.S. application Ser. No. 821,738, filed on Mar. 18, 1997, the assignee of which is the assignee of the present invention. The gear nut 44 preferably has 12 teeth on a 0.9231 inch pitch diameter with a profile known in the gear industry as a "Modified Fellows Stub Tooth" profile with a Fellows Diametrical Pitch of 13/16. This results in a shorter, fatter tooth than a standard tooth profile. In addition, the worm ratio is preferably 12:1. This allows the worm tool to support the greater output load now required of over 180 Nm torque at the shaft for pull-off.

A generally annular hub cap 56 preferably includes an externally threaded portion 58 complementary to the threads 36 on the outer end 34 of the bore 32. The hub cap 56 further preferably includes an allen socket 60 or hex head socket or other means for facilitating the threadable engagement of the hub cap 56 to the hub 28 with a tool or otherwise.

A generally concave hub plate 64 includes a lower hexagon orifice 66 complementary to the hex head 40 on the outer end 34 of the hub 28. The hub plate 64 includes a surface 68 to which an airbag inflator assembly can be secured. The steering wheel assembly 22 includes an airbag inflator 72 to be mounted to the hub plate 64.

During assembly, the hub plate 64 is preferably spot welded to the hub 28 with the hex head 40 of the hub 28 disposed within the complementary orifice 66 of the hub plate 64 to further prevent relative rotation. The gear nut 44 is inserted into the bore 32 of the hub 28. The hub cap 56 is then threaded onto the outer end 34 of the hub 28, thereby retaining the gear nut 44 within the bore 32. The airbag inflator 72 is then secured to the hub plate 64 such as by spot welding the airbag inflator 72 to the surface 68.

This steering wheel assembly 22 is then secured to the steering shaft 24. First, the steering shaft 24 is inserted into the bore 32 of the hub 28. The worm tool 52 is then inserted into one of the worm bores 38, such that the worm 50 engages the teeth 46 on the gear nut 44. Rotation of the worm tool 52 causes rotation of the gear nut 42 about the axis of the steering column shaft 24 thereby securing the gear nut 44 and the hub 28 onto the outer end 26 of the steering shaft 24.

Figure 2:
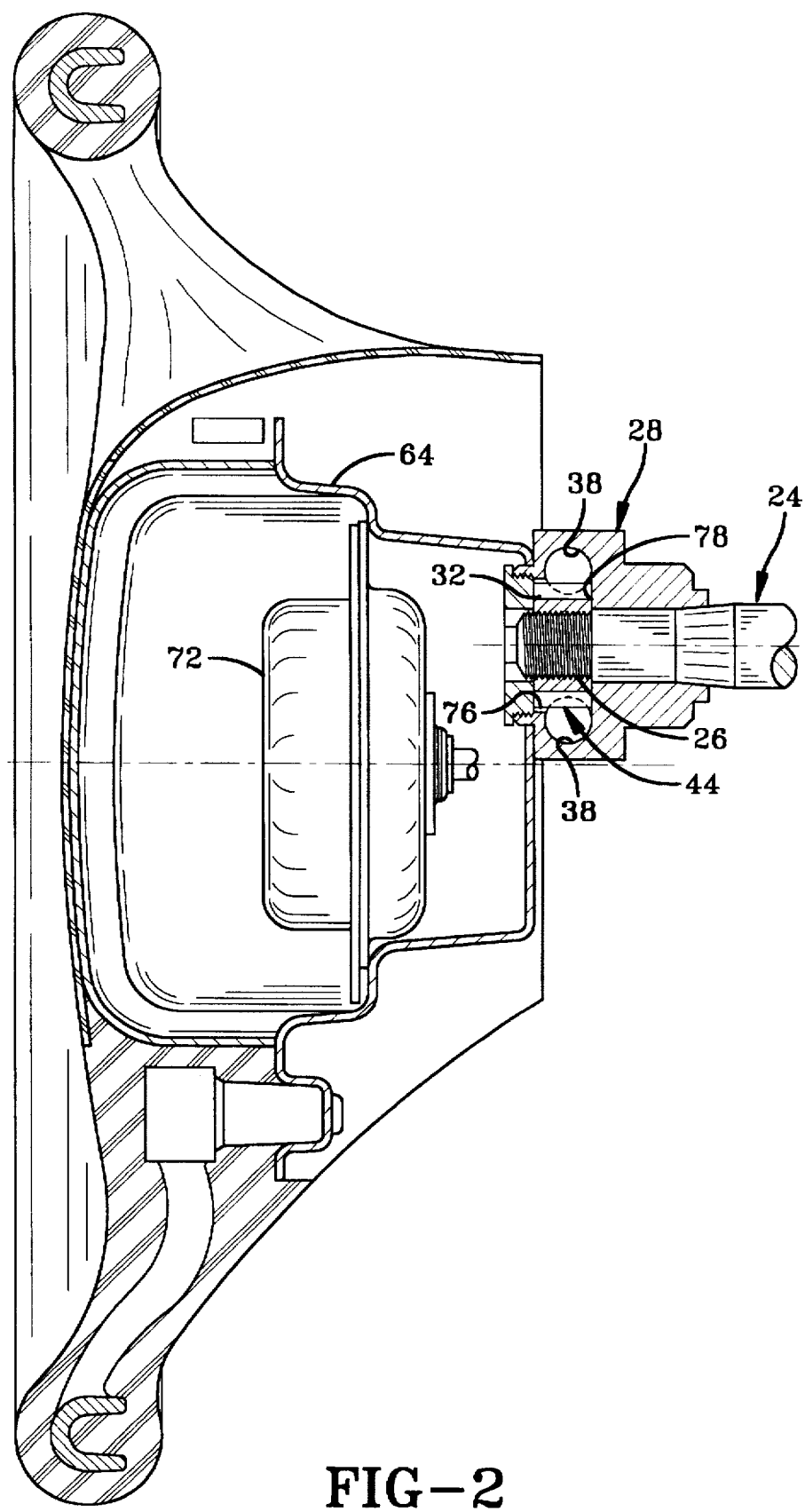
FIG. 2 is a sectional view of an assembled steering wheel assembly of FIG. 1.

The assembled vehicle steering assembly 20 is shown in FIG. 2. The gear nut 44 is threadably secured to the outer end 26 of the steering shaft 24 within the bore 32 of the hub 28. The gear nut 44 is disposed within an upper cavity 76 of the bore 32 in the hub 28. The upper cavity 76 preferably has an increased diameter relative to the remainder of the bore 32, thereby creating a bearing surface 78 upon which the gear nut 44 rests.

As can be further seen in FIG. 2, the worm bores 38 are preferably disposed on either side of the bore 32 in the hub 28. The worm bores 38 are preferably generally circular in cross section with a portion of the upper cavity 76 intersecting the cross section of the worm bores 38 such that the worm 50 on the worm tool 52 will engage the teeth 46 on the gear nut 44.

It should be recognized that the gear nut 44 could be alternatively provided with a shaft having external threads and extending downwardly into an internally threaded socket of the steering column shaft. Such an arrangement is disclosed in copending U.S. application Ser. No. 08/522,627 filed Sep. 1, 1995, the assignee of which is the assignee of the present invention.

During removal of the steering wheel assembly 22 from the steering column shaft 24 the worm tool 52 is inserted into the opposite one of the worm bores 38 as during installation, such that the worm 50 engages the teeth 46 of the gear nut 44. The worm tool 52 is then rotated causing the gear nut 44 to threadably disengage the steering column shaft 24. During removal, the gear nut 44 impinges upon the hub cap 56 which directly transmits force to the hub 28 and places no direct stress upon the airbag inflator 72 or any of the connection points between the airbag inflator 72 and the hub plate 64 or between the hub plate 64 and the hub 28. Rotation of the gear nut 44 during removal forces the steering column shaft 24 downwardly away from the steering wheel assembly 22, thereby assisting in its removal.

Figure 3:
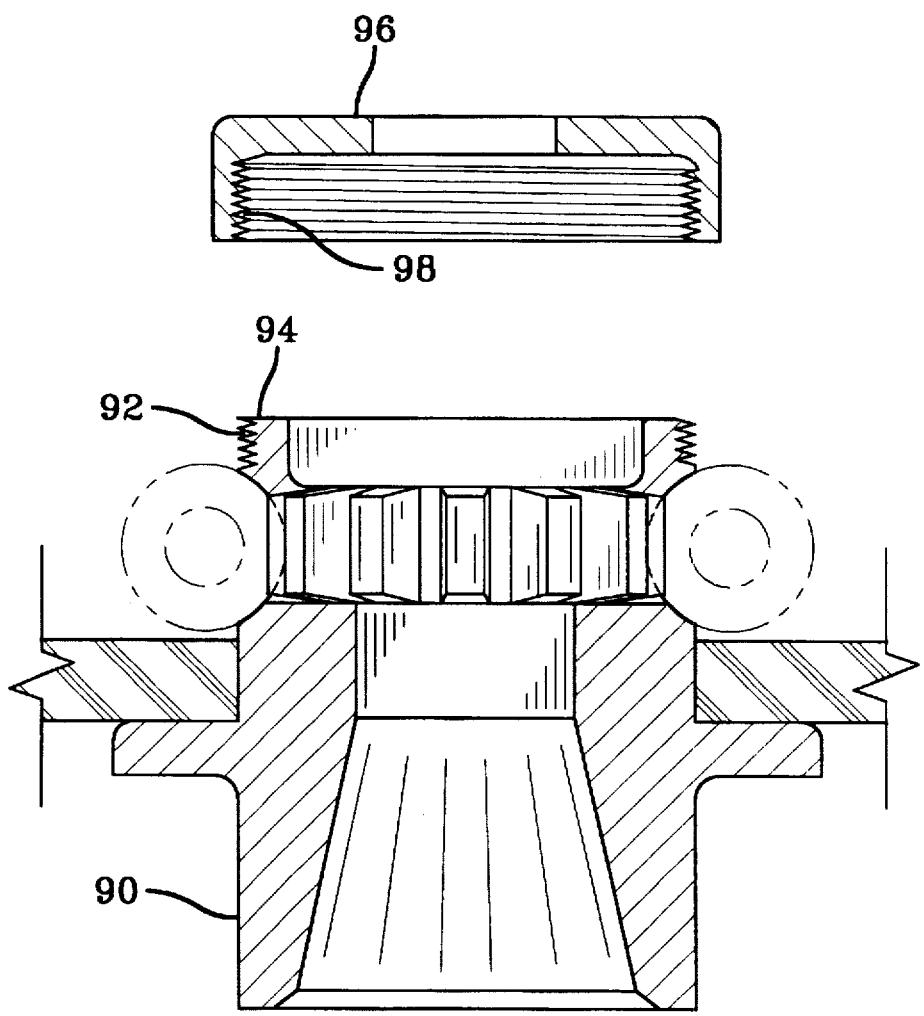
FIG. 3 is a sectional view of an alternate hub and hub cap which could be used in the steering wheel assembly of FIG. 1.

An alternate hub 90 is shown in FIG. 3 having external threads 92 and an outer end 94 of the hub 90. An alternate hub cap 96 is preferably generally cup shaped and having internal threads 98 complementary to the external threads 92 of the hub 90. The alternate hub 90 and hub cap 96 can be used in the vehicle steering assembly 20 of FIG. 1.

Figure 4:
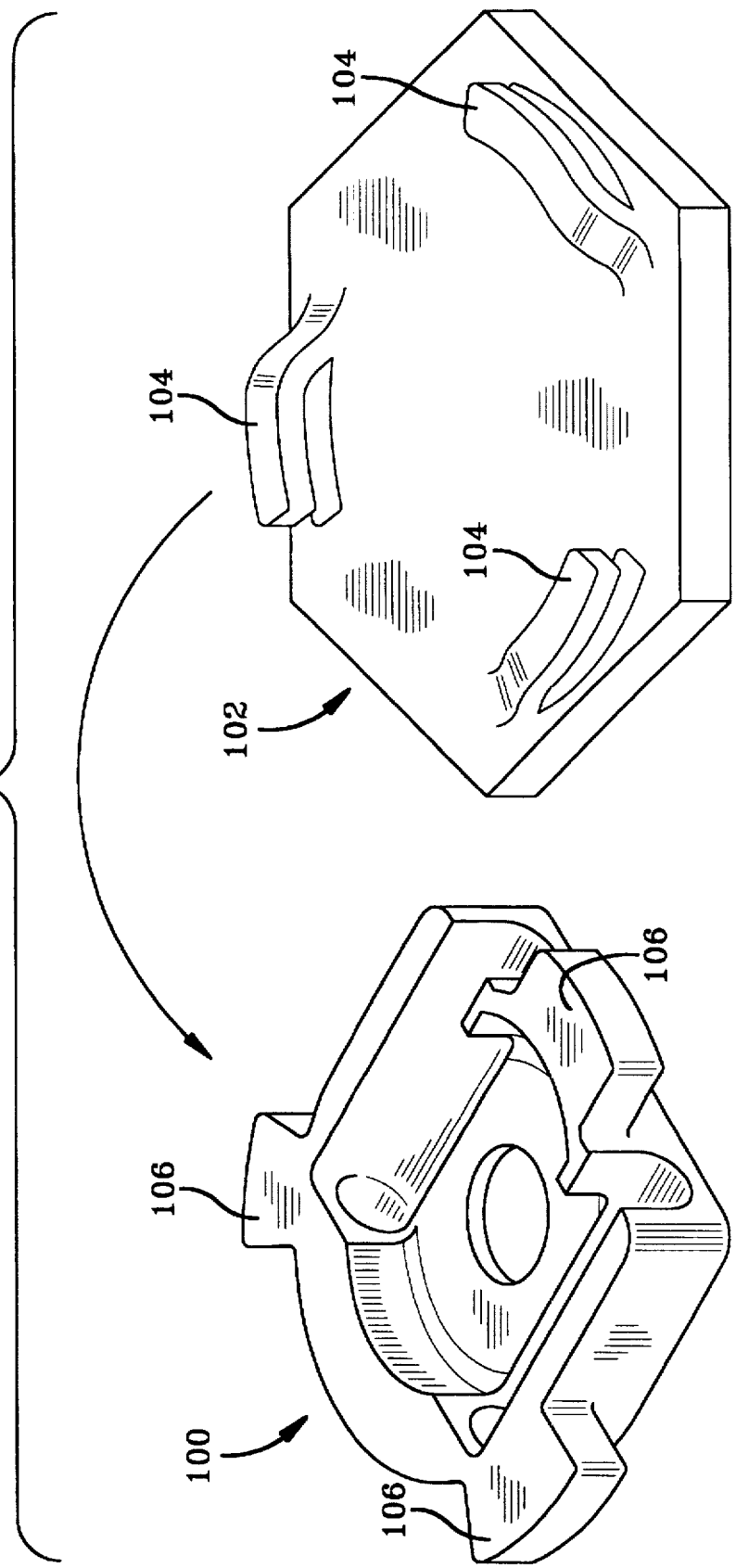
FIG. 4 illustrates an alternate hub and hub cap which could be used in the steering wheel assembly of FIG. 1.

Another alternate hub 100 and hub cap 102 are shown in FIG. 4 having an alternate method for connecting the hub cap 102 to the hub 100. The hub cap 102 includes a plurality of radially extending tabs 104. The hub 100 includes a plurality of circumferentially spaced slots 106. The hub cap 102 is secured to the hub 100 by inserting the tabs 104 into the slots 106 and rotating the hub cap 102 approximately ¼ turn. This embodiment provides cost advantages over the threaded hub and hub cap described above.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A steering wheel and airbag assembly comprising:
   a hub having a cavity defined by an upper surface at an axial outer end of said cavity;
   an airbag assembly mounted on said hub;
   a gear having circumferentially spaced teeth complementary to a wormgear, said gear further including threads, said gear disposed in said cavity of said hub below said upper surface.

2. The steering wheel and airbag assembly of claim 1 wherein said hub includes an axial bore, said axial bore including said cavity having a diameter greater than the remainder of said axial bore.

3. The steering wheel and airbag assembly of claim 1 further including a steering shaft having a threaded outer end, wherein said hub is removable from said steering shaft by rotating said gear relative to said steering shaft, such that said gear abuts said upper surface of said cavity, thereby forcing said hub away from said shaft.

4. The steering wheel and airbag assembly of claim 1 wherein said gear includes an internally threaded bore, said outer end of said steering shaft having external threads complementary to said threaded bore.

5. The steering wheel and airbag assembly of claim 1 wherein said hub includes a hubcap secured to an axial outer end of said cavity, said hubcap including said upper surface.

6. The steering wheel and airbag assembly of claim 5 wherein said airbag assembly is spaced axially from said hubcap.

7. The steering wheel and airbag assembly of claim 5 wherein said hubcap includes threads complementary to threads in said outer end of said axial bore.

8. The steering wheel and airbag assembly of claim 7 wherein said hubcap is externally threaded and said axial bore is internally threaded.

9. The steering wheel and airbag assembly of claim 7 wherein said hubcap is internally threaded and said axial bore is externally threaded.

10. A steering wheel assembly comprising:

a steering shaft having a threaded outer end;

a hub mounted on said outer end of said steering shaft, said hub including a cavity for receiving said outer end of said steering shaft;

a gear having circumferentially spaced teeth complementary to a wormgear, said gear further including threads complementary to said threaded outer end of said steering shaft, said gear disposed in said cavity of said hub; and means for transferring axial force from said gear axially away from said shaft to said hub.

11. The steering wheel assembly of claim 10 wherein said means for transferring axial force includes a hubcap secured to an axial outer end of said cavity.

12. A method for assembling and removing a steering wheel and airbag assembly from a steering shaft comprising:

a) inserting a gear having circumferentially spaced teeth into a cavity formed in a steering wheel hub, said gear further including threads complementary to a threaded outer end of a steering shaft;

b) inserting a threaded outer end of a steering shaft through an axial inner end of said cavity in said hub;

c) engaging said teeth of said gear with a tool;

d) threadably engaging said gear with said steering shaft by rotating said gear with said tool;

e) threadably disengaging said gear from said steering shaft by rotating said gear with said tool; and f) transferring force from said gear axially away from said steering shaft directly to said hub during said step e), thereby forcing said hub away from said steering shaft.

13. The method of claim 12 further including the step of forming an upper surface at an axial outer end of said cavity, said upper surface transferring said force from said gear directly to said hub.

14. The method of claim 13 further including the step of securing a hubcap on said axial outer end of said cavity, said hubcap including said upper surface.

15. The method of claim 14 further including the steps of:

threading said hubcap onto said axial outer end of said cavity.

* * * * *